United States Patent [19]

Sun et al.

[11] 4,246,472
[45] Jan. 20, 1981

[54] CONTROLLED STORE SEPARATION SYSTEM

[75] Inventors: John Sun; John C. Fartro, both of Fredericksburg; Richard A. Ramey, Spotsylvania County, all of Va.

[73] Assignee: The United States of America as represented by the Secretary of the Navy, Washington, D.C.

[21] Appl. No.: 970,423

[22] Filed: Dec. 18, 1978

Related U.S. Application Data

[63] Continuation-in-part of Ser. No. 685,224, May 11, 1976, abandoned.

[51] Int. Cl.³ .................... G06F 15/58; F41F 3/06
[52] U.S. Cl. .................... 235/401; 89/1.5 E; 244/137 R; 364/423
[58] Field of Search ............... 89/1.5 E; 235/400, 401; 364/923; 244/137 R

[56] References Cited

U.S. PATENT DOCUMENTS

| | | | |
|---|---|---|---|
| 3,018,691 | 1/1962 | Merkin | 89/1.5 E |
| 3,091,993 | 6/1963 | Brink et al. | 235/402 |
| 3,132,561 | 5/1964 | Holland | 89/1.5 E |
| 3,264,451 | 8/1966 | Faxen et al. | 235/402 |
| 3,474,704 | 10/1969 | Faxen et al. | 235/402 |
| 3,699,310 | 10/1972 | Cole | 235/401 |
| 4,043,525 | 8/1977 | Jakubowski, Jr. | 244/137 R |

*Primary Examiner*—Felix D. Gruber

[57] ABSTRACT

An ejector system for air launched weapons which considers the aircraft, store-ejector and store as a single system rather than as separate components. The system includes a dual-piston store ejector having sufficient ballistic impulse and variable orifice capability to compensate for in-carriage store pitching moments and loads whereby greatly enhanced safe and accurate store separation is obtained.

6 Claims, 2 Drawing Figures

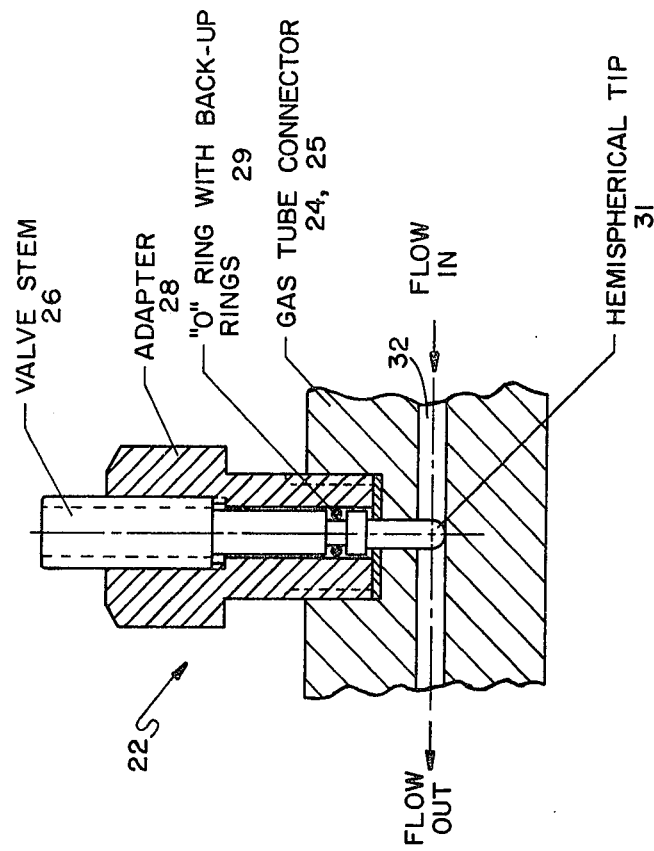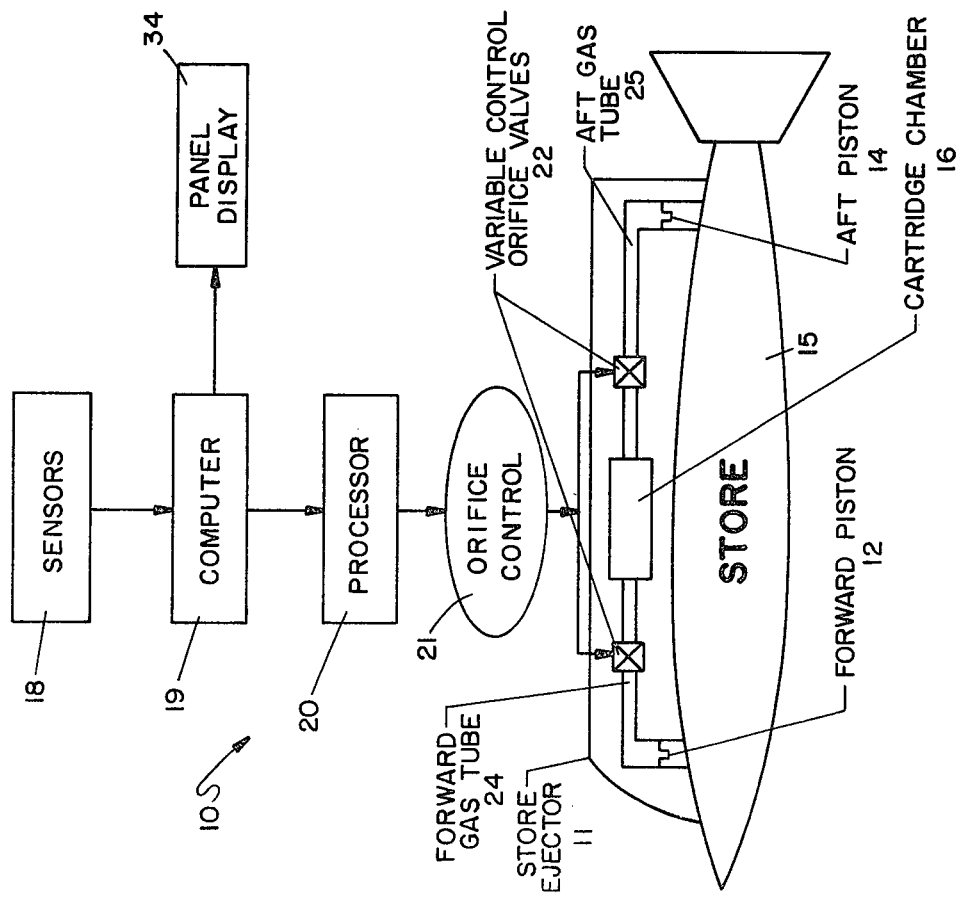

CONTROLLED STORE SEPARATION SYSTEM

CROSS-REFERENCE TO RELATED APPLICATION

This application is a continuation-in-part of Application Ser. No. 685,224, filed May 11, 1976, now abandoned.

BACKGROUND OF THE INVENTION

This invention relates generally to ejector systems for air launched weapons and more particularly to such systems utilizing ballistic ejector pistons and provided with variable orifices for adjusting the thrust of the pistons to provide controlled store separation.

The problem of aircraft store separation dates back to the First World War. Recently, an intensive literature search and comprehensive study of this problem showed that many problem areas related to store separation have been investigated and defined. However, no solution to the overall store separation problem has been found.

It is well recognized that after ejection of a store from an aircraft, the free-fall trajectory is sensitive to the end of stroke pitch-rate, the ejection velocity, the pitch angle, and the time duration of the ejection process. These factors can cause excessive ground impact miss distances. The problem becomes increasingly severe if the store is released at higher aircraft speed and lower ejection velocity and g-load. Relatively small pitching moment and slight changes in release condition can lead to radical changes in initial motion.

Current naval aircraft store ejectors (both missile launchers and bomb racks) utilize gas pressure supplied by ballistic cartridges to power ejector pistons. Ejection force, pitch rate, pitch angle, and initial velocity are controlled by metering the gases through orifices of fixed size. With these fixed size orifices, it is not possible to compensate for all combinations of flight parameters. These parameters include: aircraft speed, aircraft altitude, aircraft g-load, store type, store density (i.e., full versus empty fuel tank), store location (centerline, inboard, outboard, etc.), and in-carriage and interference aerodynamic forces. This inability to compensate for all flight conditions can lead to store-aircraft collisions and to the derivation of store trajectories from the desired ballistic trajectories. The fixed size orifices were selected from trial and error "ground" testing to satisfy acceleration, pitch rate, and separation requirements imposed by a spectrum of aircraft flight regimes. It is hardly conceivable that the store would hit the target without proper consideration of the exterior ballistic effects during store ejection.

Wind tunnel tests conducted as part of the Navy conformal carriage program showed that stores released from different stations underneath an F-4B scale model had different amounts of pitch. The tests also showed that ROCKEYE II dispensers released at supersonic speeds underwent an unsafe noseup motion. These motions were corrected by selecting suitable orifice areas. This suggests that variable control orifices could improve the trajectory accuracy and permit adjustments for station-to-station variation.

During prototype flight testing the SUU-51A/B bomb dispenser experienced a separation problem when released from the centerline station of an inboard triple ejector rack (TER) on an F-4 aircraft at high supersonic speeds. A violent nose down pitch caused the tail of the weapon to rise and contact the tails of weapons on the adjacent shoulder stations. It was concluded that a dual piston, high impulse, tunable ejector system offered the most promising solution to a long-range store separation problem.

SUMMARY OF THE INVENTION

The present invention includes sensors for detecting flight parameters and a fire control computer for determining control orifice sizes in a dual-piston store ejector system for air launched weapons. A processor converts the computer signals to mechanical signals to achieve the orifice control mechanisms which adjusts the orifice sizes to control the ballistic gas pressure on each ejector piston. By appropriate orifice area selection, the pressures acting on the ejector pistons are controlled, thereby controlling the pitch-rate, pitch-angle, ejection velocity and acceleration of the store.

BRIEF DESCRIPTION OF THE DRAWINGS

FIG. 1 is a schematic representation of the present invention; and

FIG. 2 is a sectional view of the variable control orifice value of the present invention.

DESCRIPTION OF THE PREFERRED EMBODIMENT

Referring first to FIG. 1 there can be seen the controlled store separation system of the present invention, designated generally by the reference number 10, comprising a standard store ejector 11 having forward and aft ejector pistons 12 and 14 and mounting a store 15. A cartridge chamber 16 is provided within the ejector 11 wherein a solid propellant is burned to provide high pressure gas for actuating the ejector pistons 12 and 14. Alternatively, pneumatic or hydraulic pressure might be used. The aforedescribed portions of the system have not been shown in greater detail because this structure is conventional and well known to those skilled in the art.

The system also includes flight parameter sensors 18, a fire control or mini computer 19 responsive to the outputs of the sensors 18, and a processor 20 which translates the electrical outputs of the computer into mechanical outputs. The mechanical outputs of the processor 20 in turn drive an orifice control mechanism 21, which may comprise a pair of step motors or other servomechanisms, which in turn actuate variable control orifice valves 22 disposed in the forward and aft gas tubes 24 and 25.

Referring now to FIG. 2, it can be seen that the valve 22 comprises a valve stem 26 threaded into an adapter 28 which in turn is threaded into the gas tube 24 or 25. The valve stem 26 is provided with an "O" ring and back-up ring assembly 29 and a copper seal 30 is provided for the adapter 28. The valve stem 26 has a hemispherical tip 31 on its lower end which completely closes the cylindrical passage 32, in the gas tube 24 or 25 when the valve stem is in its lowermost position. This type of valve construction has been found to be much more effective in resisting hot gas erosion than fixed metering devices.

OPERATION

In order that a better understanding of the invention may be had, its mode of operation will now be described.

Mathematical Formulation

The motion of the store essentially includes three phases.

Phase 1: This phase includes the interval from the time, t=0, when the cartridges receive an ignition pulse to the time, t=$t_s$, when both forward and aft pistons are fully extended with the store in direct contact with the pistons. During this phase it is necessary to consider the coupled effects of the interior ballistics of the ejector system and the exterior ballistics of the store submerged inside the flowfield around the aircraft.

Phase 2: Immediately after the store separates from the ejector pistons, the force applied by the pistons becomes zero and the only external forces are in aerodynamic forces and the gravitational force. Therefore, only the exterior ballistic effects are considered during this phase.

In both phase 1 and phase 2, the store is inside the aircraft flowfield and is influenced by the nonuniform wake effects. This period is usually defined as the "store separation" phase.

Phase 3: After the store escapes from the nonuniform flowfield and enters the uniform flowfield, the store motion can be described by the classical ballistic trajectory or the six-degrees-of-freedom computer model.

Phase 3 has been studied extensively in the past. The present invention is devoted to the store separation phase. Determination of the conditions at the end of phase 2 will provide improved initial conditions for the ballistic trajectory calculations by the aircraft fire control computer for both dual and single piston store ejector systems.

EXTERIOR BALLISTICS

During store ejection, the normal forces exerted on the store by the ejector pistons are large and the frictional forces are usually larger than the aerodynamic drag. Therefore, a no-slip condition between the ejector piston and the store normally exists. (For the numerical study considered here, the no-slip condition exists.) The nomenclature used in the following equations is listed in a section so entitled following Equation (43).

Due to the piston constraints and the small ejection time, the angles $\theta_B$ and $\theta_L$ are likely to be small.

By assuming no-slip, $\theta_B \dot{=} \theta_L \dot{=} 0$, the governing equations for exterior ballistics will be as follows.

The equations of motion in the x and z directions, where x is parallel to the relative wind direction at t=0 and z is perpendicular to x, are:

$$m_B \ddot{x}_B = -C_A qS \cos\theta_B - C_N qS \sin\theta_B - m_B g \sin\phi_o \quad \text{for } t>t_s \tag{1}$$

(Note $x_B \dot{=} 0$ for $t \leq t_s$) and $$m_B \ddot{z}_B = C_A qS \sin\theta_B - C_N qS \cos\theta_B + m_B g \cos\phi_o + F_{NT}\cos\theta_B \text{ for } t>t_s \tag{2}$$

$$m_B \ddot{z}_B = C_A qS \sin\theta_B - C_N qS \cos\theta_B + m_B g \cos\phi_o + F_{NT}\cos\theta_o \text{ for } t\leq t_s \tag{3}$$

where $$F_{NT} = P_{2F}A_{2F} + P_{2A}A_{2A} - K_F \dot{y}_F - K_A \dot{y}_A \tag{4}$$

$$F_A = P_{2A}A_{2A} - K_A \dot{y}_A, \tag{5}$$

$$F_F = P_{2F}A_{2F} - K_F \dot{y}_F.$$

The moment equation is $$I\ddot{\theta}_B = F_A L_A - F_F L_F + C_m qSd + (d/2v)C_{m\theta}qSd\dot{\theta}_B \tag{6}$$

where $$L_A \dot{=} H_A \text{ and } L_F \dot{=} H_F \tag{7}$$

for small angle approximation during ejection cycle, and $$q = \tfrac{1}{2}\rho v^2 = \tfrac{1}{2}\rho[(U_o + \dot{x}_B)^2 + \dot{z}_B^2] \tag{8}$$

The angular rate of the store ejector, the forward and aft piston displacement and velocity are:

$$\dot{\theta}_L = [N_g - \cos(\phi_o + \theta_L - \theta_o)]g/U_o \tag{9}$$

$$y_A = y_F - (|H_A| + |H_F|)(\theta_L - \theta_B), \tag{10}$$

or $$y_A = \int \dot{y}_A dt + y_{Ao}$$
$$y_F = z_B - z_L + |H_F|\theta_L - [(x_L - x_B) + |H_F|]\theta_B, \tag{11}$$

or $$y_F = \int \dot{y}_F dt + y_{Fo}$$
$$\dot{y}_A = \dot{y}_F - (|H_A| + |H_F|)(\dot{\theta}_L - \dot{\theta}_B) \tag{12}$$

$$\dot{y}_F = \dot{z}_B - \dot{z}_L + |H_F|\dot{\theta}_L - [(x_L - x_B) + |H_F|]\dot{\theta}_B - [(\dot{x}_L - \dot{x}_B)]\theta_B \tag{13}$$

The velocity components for the store ejector in the x and z directions relative to the point O' are for small values of $\theta_L - \theta_o$:

$$\dot{x}_L = -U_o[(\theta_L - \theta_o)^2/2] \tag{14}$$

$$\dot{z}_L = -U_o(\theta_L - \theta_o) \tag{15}$$

The position of the store and the launcher relative to the stationary axis can be obtained from the following coordinate transformations:

$$x_B' = (x_B + U_o t)\cos\phi_o + z_B \sin\phi_o \tag{16}$$

$$z_B' = z_B \cos\phi_o - (x_B + U_o t)\sin\phi_o \tag{17}$$

$$x_L' = (x_L + U_o t)\cos\phi_o + z_L \sin\phi_o \tag{18}$$

$$z_L' = z_L \cos\phi_o - (x_L + U_o t)\sin\phi_o \tag{19}$$

The values of $\dot{\theta}_B$, $\theta_B$, $\theta_L$, $z_L$, $x_L$, $\dot{x}_B$, $x_B$, $\dot{z}_B$, $z_B$ can be obtained by integration.

The angle of attack is $$\alpha_B = \theta_B - \gamma_B \tag{20}$$

where $$\gamma_B = \tan^{-1} -\frac{\dot{z}_B}{U_0 + \dot{x}_B}. \tag{21}$$

To obtain a simple demonstration of this model, the nonlinear aerodynamic decay law represented in an exponential form is selected. The normal force and pitch moment coefficients can be written as [see Jones, D. A., III, *Some Aspects of the Aircraft Store Separation Problem*, NWL Technical Report TR-2206, Naval Weapons Laboratory, Dahlgren, (1968); *F-14A Crash*, Aviation Week and Space Technology, page 25, June 1973; and Hooton, J., *Flight Test Results for an Instrumented TER-9 Bomb Rack*, Technical Report AFATL-TR-73-111, Air Force Armament Laboratory, May 1973].

$$C_N = C_{NI} + C_{n\alpha}\alpha_\beta = C_{N0}e^{-\beta_{zL B}} - C_{N\alpha}a_\beta \qquad (23)$$

$$C_m = C_{mI} + C_{m\alpha}\alpha_B = C_{m0}e^{-\beta_{zL B}} + C_{m\alpha}\alpha_B \qquad (24)$$

where $$C_{N_0} = {''}C_{z_0}. \qquad (25)$$

The above equations govern the exterior ballistics of the store 15. Thus, it is possible to obtain optimum entry into the uniform flowfield by controlling the forces and moments generated by the forward and aft pistons. The piston forces are a function of the gas pressure generated by burning propellant. These forces can be controlled by inserting a metering device between the burning propellant and the pistons to control the gas pressure.

Interior Ballistics

A typical store ejector consists mainly of the gas actuated mechanical linkages and the gas system. The gas system of FIG. 1 is composed of a cartridge chamber 16, orifices 22, the forward and aft gas tubes 24 and 25 and the forward and aft piston assemblies 22. When the cartridges are initiated, propellant gas travels through the orifices into the gas tubes. (It is noted here that the following interior ballistics model can be modified to account for gases other than propellant gases.) The gas is metered by the orifices. By varying or selecting appropriate orifice areas, the pressure at each ejector piston can be controlled, thereby controlling the store ejection velocity, pitch rate, and pitch angle.

The interior ballistic model developed Hedden et al. [Hedden, S. E., J. M. Massey, Jr., and P. N. Stamoules, *An Evaluation of the High-Low Ballistic Principle for Cartridge Actuated Devices*, NWL Report Number 1964, Naval Weapons Laboratory, Dahlgren, (1965).] is generalized in the following study for describing the complicated store ejector gas system. It is assumed that the gas system is a high-low ballistic system and the propellant parameters and the heat losses used in the mathematical model can be empirically determined for the particular gas system considered.

The burning rate equation is a nonlinear equation which describes the rate of regression of the surfaces of the propellant $$\dot{l} = \dot{l}(P) \qquad (25)$$

It is usually written as $$\dot{l} = BP^n \qquad (26)$$

where the burning rate coefficient, B, and burning rate exponent, n, are determined experimentally.

Integration of Equation (25) yields the distance burned from the propellant grain surface $$l = \int_0^t \dot{l}\,dt \qquad (27)$$

The form function relating the mass of propellant burned at any time t to the distance burned at that time (Piobert's Law) is $$C = C_b[a_1 l + a_2 l^2 + a_3 l^3] \qquad (28)$$

where $a_1$, $a_2$ and $a_3$ are constants depending upon the geometry of the grain.

The mass of the propellant gas produced at time t is equal to the total amount of gas present in the gas system at time t minus the initial mass of gas inside the gas system at time $t=0$ $$C_1 = C - C_2 + (C_{1i} + C_{2i}) \qquad (29)$$

The combination of the equation of state and energy equation gives the following relation $$P_1 = Z_1/V_1 \qquad (30)$$

where $$Z_1 = F(1 - K_1)C_1 \qquad (31)$$

$$V_1 = V_{C_1} - C_b/\rho_p + C/\rho_p - \rho C_1 \qquad (32)$$

$$F = RTv/\overline{M} \qquad (33)$$

Equation (31) includes the factor $(1-K_1)$ to account for heat losses in the cartridge chamber. $K_1$ is determined experimentally.

The combination of the equation of state and the energy equation then gives $$P_{2F} = \frac{(1 - K_1)(1 - K_{2F})FC_{2F} - (\gamma - 1)\int_0^t P_{2F}\dot{V}_{2F}dt}{V_{2F}} \qquad (34)$$

$$P_{2A} = \frac{(1 - K_1)(1 - K_{2A})FC_{2A} - (\gamma - 1)\int_0^t P_{2A}\dot{V}_{2A}dt}{V_{2A}} \qquad (35)$$

where $$\dot{V}_{2F} = A_{2F}\dot{y}_F - \eta\dot{C}_{2F} \qquad V_{2F} = \dot{V}_{2F}dt + V_{C2F} \qquad (36)$$
$$\dot{V}_{2A} = A_{2A}\dot{y}_A - \eta\dot{C}_{2A} \qquad V_{2A} = \dot{V}_{2A}dt + V_{C2A} \qquad (37)$$
$$A_{2F} = A_{2F}(y_F) \qquad (38)$$
$$A_{2A} = A_{2A}(y_A) \qquad (39)$$

As in Equation (31), $K_{2F}$ and $K_{2A}$ are determined experimentally to account for heat losses inside the forward and aft gas tube-piston assembly, respectively. From nozzle theory [Sutton, G. P., *Rocket Propulsion Elements*, (New York: John Wiley and Sons, Incorporated, 1957)] we can obtain the discharge coefficients $$\Psi_F, \Psi_A = \qquad (40a)$$

$$\begin{cases} \sqrt{\gamma}\left(\dfrac{2}{\gamma+1}\right)^{\frac{\gamma+1}{2(\gamma-1)}} \text{ for } \dfrac{P_{2A,2F}}{P_1} \leq \left(\dfrac{2}{\gamma+1}\right)^{\frac{\gamma}{\gamma-1}} \\[2mm] \sqrt{\dfrac{2\gamma}{\gamma-1}}\left(\dfrac{P_{2A,2F}}{P_1}\right)^{\frac{1}{2}}\left[1 - \left(\dfrac{P_{2A}P_{2F}}{P_1}\right)^{\frac{\gamma-1}{\gamma}}\right]^{\frac{1}{2}} \end{cases} \qquad (40b)$$

Otherwise, Equation (40b) can be approximated by $$\Psi_F, \Psi_A = \gamma^{\frac{1}{2}} \left(\frac{2}{\gamma+1}\right)^{\frac{\gamma+1}{2(\gamma-1)}} \sqrt{1 - \left[\frac{P_{2A,2F}/P_1 - \left(\frac{2}{\gamma+1}\right)^{\frac{\gamma}{\gamma-1}}}{1 - \left(\frac{2}{\gamma+1}\right)^{\frac{\gamma}{\gamma-1}}}\right]^2} \quad (40c)$$

and the mass presented inside the forward and aft gas tubes and piston assemblies is $$C_{2F} = \int_0^t \frac{\omega_A A_{0F} P_1}{\sqrt{F(1-K_1)}} + C_{2Fi} \quad (41)$$

$$C_{2A} = \int_0^t \frac{\Psi_A A_{0A} P_1}{\sqrt{F(1-K_1)}} + C_{2Ai} \quad (42)$$

where $$C_2 = C_{2F} + C_{2A}, \quad \dot{C}_2 = \dot{C}_{2F} + \dot{C}_{2A} \quad (43)$$

The Equations (41) and (42) governing the interior ballistic effects of the system are solved simultaneously with the Equations (1), (2) and (3) governing exterior ballistic effects.

The optimum approach is to vary the size of the orifices so that the store can achieve optimized angle of attack and pitch rate as the store exits the nonuniform flowfield. This constituted a two-point boundary value problem with the two orifice areas as the initial boundary condition and the angle of attack and pitch rate as the end boundary condition.

Nomenclature

| | Units | |
|---|---|---|
| $a_1, a_2, a_3$ | $m^{-1}, m^{-2}, m^{-3}$ | Form function coefficients |
| A | $m^2$ | Cross-sectional area of the piston |
| $A_{2A}, A_{2F}$ | $m^2$ | Cross-sectional area of the aft and forward piston, respectively |
| $A_{oA}, A_{oF}$ | $m^2$ | Cross-sectional area of the aft and forward orifices, respectively |
| B | | Burning rate coefficient |
| C | kg | Total mass of gas produced at time t |
| $C_1, C_2$ | kg | Mass of gas inside the cartridge chamber upstream of the orifices and mass of gas inside gas tubes and piston-assemblies (both aft and forward) downstream of the orifices, respectively, at time t |
| $C_{1i}$ | kg | Total mass of gas present in cartridge chamber upstream of the orifices at time t = 0 |
| $C_{2A}, C_{2F}$ | kg | Mass of gas inside the aft and forward gas tube - piston assembly downstream of the orifices at time t, respectively |
| $C_{2Ai}, C_{2Fi}$ | kg | Mass of gas inside the aft and forward gas tube - piston assembly down stream of the orifices at time t = 0, respectively |
| $C_{2i}$ | kg | Total mass of gas present in both forward and aft gas tubes and piston assemblies downstream of the orifices at time t = 0 |
| $C_A$ | — | Axial force coefficient of store alone in free stream = axial force/Sq |
| $C_{AI}$ | — | Axial force coefficient of store at zero angle of attack inside aircraft influence flowfield = influence axial force at zero angle of attack/Sq |
| $C_{A\alpha}$ | -/radians | Axial force coefficient slope of store alone in free stream = axial force/Sq$\alpha$ |
| $C_m$ | — | Pitching moment coefficient of store alone in free stream = pitching moment/SqD |
| $C_{mo}$ | — | Aerodynamic in-carriage pitching moment coefficient |
| $C_{mI}$ | — | Pitching moment coefficient of store at zero angle of attack inside aircraft influence flowfield = influence pitching moment at zero angle of attack/SqD |
| $C_{m\alpha}$ | -/radian | Pitching moment coefficient slope of store alone in free stream = pitching moment/SqD$\alpha$ |
| $C_{m\dot{\theta}}$ | -/radian | Pitch damping coefficient |
| $C_N$ | — | Normal force coefficient of store alone in free stream = normal force/Sq |
| $C_{No}$ | — | Aerodynamic in-carriage normal force coefficient |
| $C_{NI}$ | — | Normal force coefficient of store at zero angle of attack inside aircraft influence flowfield = influence normal force at zero angle of attack/Sq |
| $C_{N\alpha}$ | -/radian | Normal force coefficients slope of store alone in free stream = normal force/Sq$\alpha$ |
| $C_{Zo}$ | — | Aerodynamic in-carriage normal force coefficient, positive downward in z-direction, opposite in sign to $C_{No}$ |
| $C_b$ | kg | Total mass of gas produced at burnout |
| $C_v$ | joule/kg-°K. | Specific heat of gas at constant volume |
| D | m | Reference diameter of the store |
| F | joule/kg | Propellant impetus = RTv/M |

-continued

Nomenclature

| | Units | |
|---|---|---|
| $F_{NA}$ | newtons | Normal force imparted to the store by the aft piston |
| $F_{NF}$ | newtons | Normal force imparted to the store by the forward piston |
| $F_{NT}$ | newtons | Total normal force imparted to the store by the pistons |
| $F_f$ | newtons | Friction force |
| g | m/sec$^2$ | Gravitational constant |
| $H_A, H_F$ | m | Distance measured from the aft piston foot and the forward piston foot to the store CG at time t = 0, respectively |
| I | kg-m$^2$ | Pitch moment of inertia of the store |
| K | newton/m | Spring constant |
| $K_1$ | — | Proportional constant relating heat losses inside the cartridge chamber (determined by experiment) |
| $K_A, K_F$ | newton/m | Spring constant for aft and piston assembly, respectively |
| $K_{2A}, K_{2F}$ | — | Proportional constants relating heat losses inside the aft and forward gas tube - piston assembly downstream of the orifices, respectively (determined by experiment) |
| l | m | Distance propellant surface has receded at time t |
| $\dot{l}$ | m/sec | Propellant burning rate |
| $L_A, L_F$ | m | Distance measured from the aft and forward piston feet to the store CG along the x-axis at time t, respectively |
| $m_B$ | kg | Store mass |
| $m_p$ | kg | Piston mass |
| M | — | Mach number |
| $\overline{M}$ | kg/(kg)mol | Molecular weight of the gas |
| n | — | Propellant burning rate exponent |
| $N_g$ | — | Number of g's, $N_g$ = lift of aircraft/weight of aircraft |
| $P_1, P_2$ | newton/m$^2$ | Gas pressure in cartridge chamber upstream of the orifices and the gas tube - piston assembly downstream of the orifices, respectively |
| $P_{2A}, P_{2F}$ | newtons/m$^2$ | Gas pressure in the aft and forward gas tube and piston assembly downstream of the orifices, respectively |
| q | newtons/m$^2$ | Dynamic pressure |
| R | joule/(kg)mol –°K. | Universal gas constant |
| S | m$^2$ | Reference cross sectional area of the store = $\pi D^2/4$ |
| t | sec | Time |
| $t_s$ | sec | Time at end of ejector strokes |
| $T_v$ | °R. | Constant volume flame temperature of the propellant gas |
| $U_o$ | m/sec | Aircraft velocity |
| v | m/sec | Store resultant velocity $[(U_o + \dot{x}_B)^2 + \dot{z}_B^2]^{\frac{1}{2}}$ |
| $v_s$ | m/sec | Store ejection velocity at end of stroke |
| $V_1$ | m$^3$ | Volume available to gases inside high chamber upstream of the orifices at time t |
| $V_{C1}$ | m$^3$ | Volume available to gases in high chamber upstream of the orifices at t = 0 |
| $V_2$ | m$^3$ | Volume downstream of both aft and forward orifices at time t |
| $V_{2A}, V_{2F}$ | m$^3$ | Volume of the aft and forward gas tube - piston assembly available to gas downstream of the orifices, respectively |
| $V_{C2A}, V_{C2F}$ | m$^3$ | Volume available to gas in the aft and forward gas tube - piston assembly downstream of orifices, respectively, at t = 0 |
| x,z | — | Coordinate axis that moves with point 0' |
| x',z' | — | Horizontal and vertical axis fixed in space |
| $x_B, z_B$ | m | Distance measured from the point 0' of x and z axis to the center of gravity of the store |
| $z_{BNT}$ | — | Nose or tail displacement of the store measured from the point 0' of z-axis |
| $z_{LB}$ | m | Distance of the center of gravity of the store in z-direction relative to the launcher |
| $x_L, z_L$ | m | Location of point C' with respect to point 0' |
| y | m | Piston displacement |
| $y_s$ | m | Stroke length |
| $y_A, y_F$ | m | Stroke length of the aft and forward pistons, respectively |
| $\gamma$ | — | Ratio of specific heats of the propellant gas = $1 + R/\overline{M}C_v$ |
| $\alpha_B$ | radian | Angle of attack of the store, positive counterclockwise |
| $\beta$ | m$^{-1}$ | Aerodynamic decay coefficient |
| $\eta$ | m$^3$/kg | Covolume factor |
| $\theta_B$ | radian | Pitch angle of the store, positive counterclockwise |

-continued

Nomenclature

| | Units | |
|---|---|---|
| $\dot{\theta}_B$ | radian/sec | Pitch rate of the store |
| $\theta_L$ | radian | Angle measured between the store ejector axis and the x-axis |
| $\theta_o$ | radian | Launch angle $\theta_L$ at time $t = 0$ |
| $\phi_o$ | radian | Angle measured between the z' and $z\vert_{t=o}$ axis |
| $\Psi_A, \Psi_F$ | — | Orifice discharge factor for the aft and forward gas tube, respectively |
| $\mu$ | — | Frictional coefficient |
| $\rho$ | kg/m³ | Density of the ambient air |
| $\rho_p$ | kg/m³ | Density of the propellant |

The sensors 18 detect various aircraft flight parameters, e.g., aircraft speed, dive angle, density altitude, angle of attack, g-loading and Mach number and feed this information to the computer 19. The computer is also programmed to take in to account input parameters such as: (a) store configuration including weight, pitch moment of inertia, center of gravity location, body length and reference cross-sectional area; (b) nonuniform interference flowfield aerodynamic characteristics when the store is either still attached or adjacent the aircraft shortly after release; (c) uniform flowfield aerodynamic characteristics of the store in free stream; and (d) the interior ballistics parameters of the cartridge and ejector pistons.

The sizes of the control orifices are then determined by the computer 19 as a function of the flight parameters by simultaneous solution of Equations (1), (2), (3), (41) and (42). The computer signals are then converted into mechanical signals by the processor 20. The processor then automatically actuates the orifice control mechanism 21 which adjusts the orifice sizes by rotation of the valve stems 26. The orifice sizes then remain constant during store ejection caused by the pilot firing the cartridge 16. The orifices are capable of controlling the ballistic gas pressure acting upon the forward and aft pistons 12, 14 which then impart the correct pitchrate and ejection velocity to the store 15, resulting in a safe store separation and improved ballistic trajectory. If flight parameters exceed the launch capability (for instance, the ballistic force is not sufficient to push the store away from the aircraft) of the store ejector, a danger signal would be displayed for the pilot on the instrument panel 34 to indicate the possibility of a store-aircraft collision. Alternatively, the danger signal could be utilized to block firing of the cartridge 16 when danger of a store-aircraft collision was present.

Obviously, many modifications and variations of the present invention are possible in the light of the above teachings. It is therefore to be understood that within the scope of the appended claims the invention may be practiced otherwise than as specifically described.

What is claimed is:

1. A controlled store separation system for air launched weapons comprising:

a dual-piston store ejector for carrying the weapon;

a means for generating fluid pressure for actuating said pistons to eject the weapon;

a pair of tubes interconnecting said fluid pressure generating means and said pistons;

a pair of variable control orifice valves, each of which is disposed in a tube between said cartridge and one of said pistons;

a plurality of sensors for detecting and signaling flight parameters;

computer means responsive to the signals from said sensors for calculating the orifice size required in each value to ensure safe store separation and accurate ballistic trajectory of said store; and means driven by said computer for adjusting each valve to the computed size whereby the ejection force of each piston may be controlled.

2. A system as defined in claim 1 wherein each of said variable control orifice valves comprises:

an adapter fixed in the wall of the tube; and a valve stem threaded into said adapter, said valve stem terminating in a hemispherical tip having a radius of curvature equal to the radius of the cylindrical passage within the tube.

3. A system as defined in claim 2 wherein said adjusting means rotates said valve stem to provide an orifice of the desired size and defined by the hemispherical tip of said valve stem and the opposite wall of the passage.

4. A system as defined in claim 1 wherein said computer means is programmed to take into account store configuration, aerodynamic characteristics of the aircraft and store, and interior ballistics parameters whereby the aircraft, store-ejector and store are treated as a single system.

5. A system as defined in claim 4 wherein each of said variable control orifice valves comprises:

an adapter fixed in the wall of the tube; and a valve stem threaded into said adapter, said valve stem terminating in a hemispherical tip having a radius of curvature equal to the radius of the cylindrical passage within the tube.

6. A system as defined in claim 5 wherein said adjusting means rotates said valve stem to provide an orifice of the desired size and defined by the hemispherical tip of said valve stem and the opposite wall of the passage.

* * * * *